Aug. 12, 1924. 1,504,746

G. F. DE WEIN

HYDRAULIC MACHINE

Filed March 27, 1922

Inventor:

Patented Aug. 12, 1924.

1,504,746

UNITED STATES PATENT OFFICE.

GEORGE F. DE WEIN, OF MILWAUKEE, WISCONSIN, ASSIGNOR TO ALLIS-CHALMERS MANUFACTURING COMPANY, OF MILWAUKEE, WISCONSIN, A CORPORATION OF DELAWARE.

HYDRAULIC MACHINE.

Application filed March 27, 1922. Serial No. 547,142.

*To all whom it may concern:*

Be it known that GEORGE F. DE WEIN, a citizen of the United States, residing at Milwaukee, in the county of Milwaukee and State of Wisconsin, has invented a certain new and useful Improvement in Hydraulic Machines, of which the following is a specification.

This invention relates in general to improvements in the art of converting hydraulic energy, and relates more specifically to an improved method of and apparatus for utilizing the energy of water under head by converting such energy into torque in a rotating shaft with the aid of a rotor.

An object of the invention is to provide an improved method of utilizing the energy of water under head. Another object of the invention is to provide simple and efficient apparatus for exploiting the method.

It has been found that the energy of water under head may be effectively converted into torque in a rotating shaft, by producing a whirling stream of water and passing this whirling stream through a suitable runner associated with the shaft. It has also been found that most efficient conversion of the energy is effected when the whirling stream advances axially with the flow threads severally at constant distances from an axis, and is permitted while thus advancing to cooperate with a purely axial flow type of runner, that is, a runner in which the flow into and from the vanes has purely axial advancement not considering its whirling motion. Such hydraulic turbine installations are capable of utilizing the energy of large quantities of water under relatively low head and are adapted to produce relatively high specific or characteristic speeds.

The present invention relates to hydraulic turbine installations of this general type and has for its object the provision of means for more efficiently conducting a whirling stream of water to and from a hydraulic rotor. With a structure embodying the present invention, the stream of water admitted to the rotor is prevented from whirling until it assumes an axial direction of advancement, thereby eliminating retardation of the inflow due to centrifugal force, and enabling admission of maximum quantities of water. The centrifugal force acting upon the water at the rotor discharge is utilized for purposes of deceleration, thereby producing an installation of maximum efficiency.

A clear conception of the novel method of converting the energy of water under head and of the structure for carrying such method into effect, may be had by referring to the drawing accompanying and forming a part of this specification in which like reference characters designate the same or similar parts in the several views.

Figure 2:
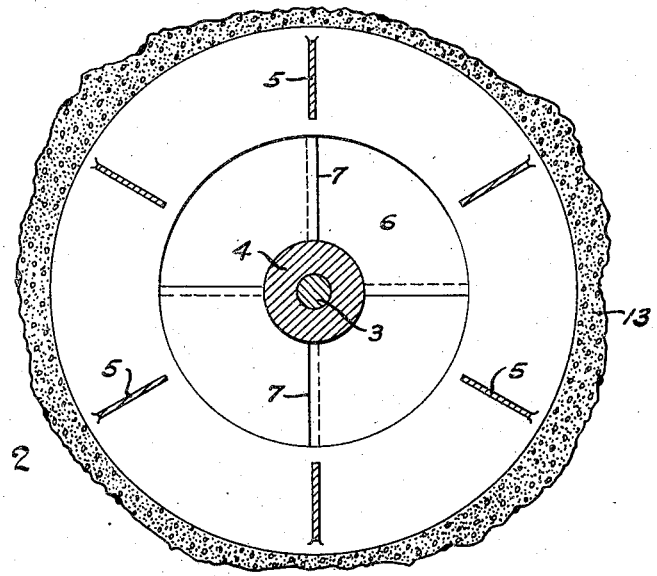
Fig. 2 is a transverse horizontal section through the installation illustrated in Fig. 1, the section being taken through the whirl preventing inlet guide vanes.

With the improved method of converting the energy of water under head, the water is caused to flow inwardly from all sides toward an axis, with radial components only. The direction of flow of the water is then changed from radial to axial. The axially advancing water is subsequently caused to whirl and to proceed as a whirling axially advancing solid stream which is then passed through a suitable rotor wherein a portion of the whirl energy is converted into torque in a rotating shaft. The whirling stream delivered from the impeller is permitted to flow outwardly away from the turbine axis immediately after leaving the rotor and has the balance of its whirl and velocity energy absorbed by virtue of expansion or enlargement of the cross-section of the discharge conduit.

Referring specifically to the drawing, the purely axial-flow high-speed turbine rotor 2 is secured to a rotary shaft 3 and is located in a conduit formed coaxial with and extending along the shaft 3. Helical stationary guide vanes 7 gradually changing from high pitch at inlet to low pitch at discharge edge are located in the axial flow conduit in advance of the rotor 2 and are spaced from the rotor vanes a sufficient distance to provide a vane-free transition space 8 between the vanes 7 and the inlet side of the rotor 2. The upper turbine casing 10 forms an inwardly extending annular conduit communicating with the axially directed rotor housing conduit, and is provided with an annular series of stationary radial vanes 5 which span the turbine inlet. Between the discharge edges of the radial vanes 5 and the inlet edges of the helical vanes 7, is a vane-free transition space 6 wherein the flow of the water is changed from radial inward to axial.

The discharge side of the turbine rotor 2 communicates with a vane-free direction-changing transition space 9 which in turn communicates with an annular diffuser chamber 14. The chambers 9, 14 are bounded by upper and lower walls 11, 12 which are so spaced that the velocity of the water flowing from the rotor 2, is gradually decelerated. The turbine casing elements may be secured to a suitable foundation 13 as illustrated.

Figure 1:
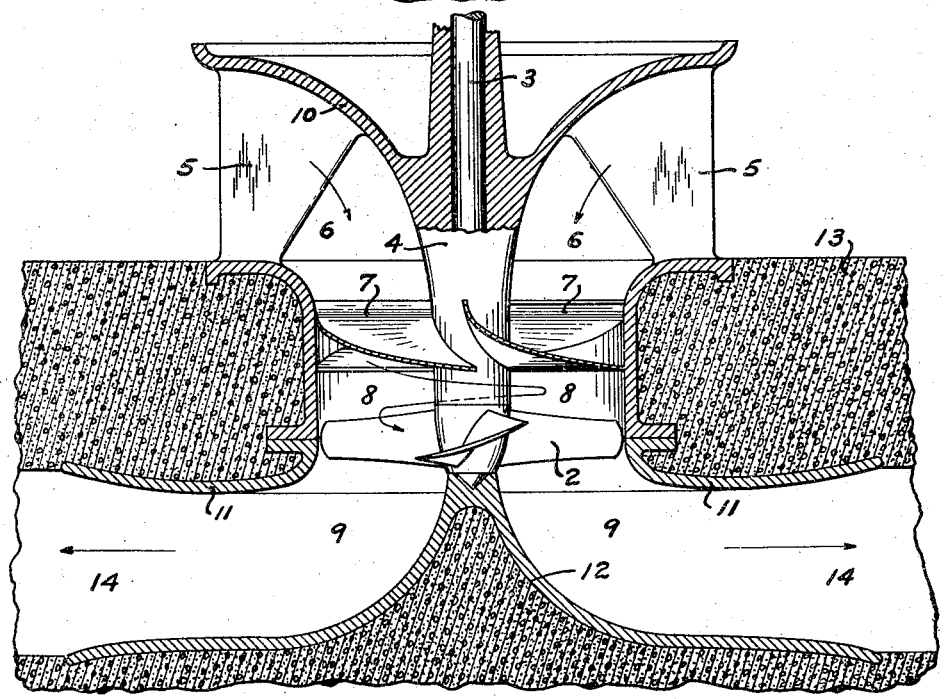
Fig. 1 is a transverse vertical section through a hydraulic turbine installation showing the improved apparatus for converting the energy of water under head.

During normal operation of the unit, the water is admitted to the spaces between the stationary radial guide vanes 5 in a direction toward the axis of the turbine shaft 3. While passing the guide vanes 5 and through the transition space 6 the course of the water is changed from radial to axial and the water is admitted to the inlet edges of the stationary helical vanes 7 as an axially advancing solid stream having practically no whirling motion. In passing through the spaces between the helical vanes 7 the stream of water is caused to whirl and is delivered from the discharge edges of these vanes in the form of an axially advancing solid whirling stream as indicated by the arrow in Fig. 1. The axially advancing whirling stream of water in passing through the axial flow rotor 2 has a portion of its energy converted into torque in the rotating shaft 3 and the rotor 2 is caused to rotate at a relatively high speed. The water delivered from the impeller 2 retains considerable of its energy and is deflected in the chamber 9 and caused to flow outwardly away from the turbine axis and through the diffusing chamber 14. In the chamber 14 the remaining whirl and velocity energy of water is converted into pressure energy, the final pressure being substantially atmospheric. The regulation of the quantity of water admitted may be effected by means of a gate located in the inlet flume either directly in advance of the vanes 5 or remote therefrom.

It will thus be noted that the stationary radial guide vanes 5 positively prevent whirling of the fluid and that whirling is subsequently effected by the stationary helical guide vanes 7 located immediately on the up stream side of the transition space 8 leading to the runner 2. By thus preventing whirling of the radially advancing water, centrifugal forces which would tend to retard entry of the water, are eliminated, and admission of maximum quantity of water is effected. The transition space 8 permits the whirling mass of water to unite and enter the runner 2 without shock. The outwardly extending diffuser chamber 14 directly adjacent to the runner discharge permits most efficient conversion of the remaining whirl energy due to the fact that the whirling liquid naturally tends to flow outwardly by centrifugal force. The entire installation is exceedingly simple and compact and effects energy conversion at maximum efficiency with minimum losses due to friction and undesirable changes in the direction of flow. It will be obvious that the principles of the present invention may be applied to other types of hydraulic machines than the axial flow-turbine herein illustrated and described.

The specific hydraulic rotor herein shown and described forms no part of the present invention being described and claimed in application, S. N. 197,964, filed October 20, 1917.

It should be understood that it is not desired to limit the invention to the exact details of construction and to the precise steps of the process herein shown and described, for various modifications within the scope of the claims may occur to persons skilled in the art.

It is claimed and desired to secure by Letters Patent:

1. The method of utilizing the energy of water under head, which consists in directing its flow inwardly toward an axis with components in radial planes only, changing the direction of flow from inward to axial, positively causing the advancing liquid to whirl about said axis, permitting the liquid to whirl freely and causing the freely whirling liquid to advance along said axis, and directing the whirling liquid against a suitable rotor.

2. The method of utilizing the energy of water under head, which consists in directing its flow inwardly toward an axis with components in radial planes only, changing the direction of flow from inward to axial, positively causing the advancing liquid to whirl about said axis, permitting the liquid to whirl freely and causing the freely whirling liquid to advance along said axis, abstracting a part of the energy in a suitable rotor, and absorbing the remaining energy by reducing the velocity by expanding the cross-section.

3. In combination, means for directing a flow of liquid in radial planes only with respect to an axis, means for causing the liquid to flow along said axis, means for positively causing the axially advancing liquid to whirl, means forming a vane free space for receiving the whirling liquid and for conducting said liquid along said axis, and a rotor located in the path of the freely whirling axially advancing liquid.

4. In combination, means for directing a flow of liquid radially inwardly toward an axis and for preventing whirling of said radially advancing liquid, means forming a vane free transition space for changing the direction of flow of the liquid from inward to axial, means for causing the axially advancing liquid to whirl, and a rotor located in the path of the whirling axially advancing liquid.

5. In combination, means for directing a flow of liquid inwardly toward an axis and for preventing whirling of said inwardly advancing liquid, means forming a vane free transition space for changing the direction of flow of the liquid from inward to axial, means for positively causing the axially advancing liquid to whirl, means forming a vane free space for receiving the whirling liquid and for causing said liquid to advance along said axis, and a rotor located in the path of the freely whirling axially advancing liquid.

6. In combination, a rotor, means for conducting liquid toward the axis of said rotor and for preventing whirling of the inwardly advancing liquid, means for subsequently conducting the liquid axially toward said rotor and for simultaneously positively causing said liquid to whirl about said axis, and means forming a vane free space for conducting the axially advancing whirling liquid toward said rotor.

7. In combination, a rotor through which a vortex of liquid is permitted to advance in an axial direction only, means for conducting liquid toward the axis of said rotor with the stream lines of said liquid confined to radial planes only, means for subsequently conducting the liquid axially toward said rotor and for positively causing the liquid to whirl around said axis, means forming a vane free space for conducting the axially advancing whirling liquid against said rotor, and means for conducting the liquid away from said rotor axis at the discharge side of said rotor.

8. In combination, a rotor through which a vortex of liquid is permitted to advance in an axial direction only, means for conducting liquid inwardly toward the axis of said rotor and for preventing whirling of said liquid, means forming a vane free transition space for changing the flow of said liquid from inward to axial, means for positively causing the axially advancing liquid to whirl about said axis, means forming a vane free space for receiving the whirling liquid and for conducting said liquid against said rotor, and means for conducting the liquid away from the axis of said rotor closely adjacent to the rotor discharge.

9. In combination, a rotor, means forming a conduit extending inwardly toward the axis of said rotor, said conduit having therein a plurality of vanes lying in radial planes with respect to said axis, means forming a conduit extending axially of said rotor, said conduit communicating with said rotor and having therein helical vanes spaced from the inlet side of said rotor, and means forming a vane free transition space connecting said conduits.

In testimony whereof, the signature of the inventor is affixed hereto.

G. F. DE WEIN.